(12) United States Patent
Jang (10) Patent No.: US 8,654,204 B2
(45) Date of Patent: Feb. 18, 2014

(54) DIGTAL PHOTOGRAPHING APPARATUS AND METHOD OF CONTROLLING THE SAME

(75) Inventor: Young-soo Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 12/948,955

(22) Filed: Nov. 18, 2010

(65) Prior Publication Data

US 2011/0115927 A1 May 19, 2011

(30) Foreign Application Priority Data

Nov. 19, 2009 (KR) ........................ 10-2009-0112183

(51) Int. Cl.
*H04N 5/228* (2006.01)
*H04N 5/225* (2006.01)

(52) U.S. Cl.
USPC ................... 348/222.1; 348/218.1; 348/208.7

(58) Field of Classification Search
USPC ................. 348/207.99, 208.99, 208.1, 208.2, 348/208.3, 208.4, 208.5, 208.6, 208.7, 348/208.8, 208.11, 208.12, 208.13, 208.15, 348/208.16, 218.1, 222.1, 333.01, 333.02, 348/333.03, 333.04, 333.05, 333.11, 348/333.12, 343, 344; 396/322, 335, 336, 396/338
See application file for complete search history.

(56) References Cited

U.S. PATENT DOCUMENTS

| | | | |
|---|---|---|---|
| 7,912,319 B2* | 3/2011 | Lakshamanan et al. | ...... 382/284 |
| 2005/0168594 A1* | 8/2005 | Larson | ........ 348/222.1 |
| 2006/0033818 A1* | 2/2006 | Wada et al. | ........... 348/208.11 |
| 2006/0181619 A1* | 8/2006 | Liow et al. | ................ 348/239 |
| 2006/0182437 A1* | 8/2006 | Williams et al. | ............. 396/429 |

FOREIGN PATENT DOCUMENTS

KR 1020050120301 A 12/2005

* cited by examiner

*Primary Examiner* — Lin Ye
*Assistant Examiner* — Peter Chon
(74) *Attorney, Agent, or Firm* — Drinker Biddle & Reath LLP (57) ABSTRACT

A digital photographing apparatus includes a handshake correction module and a method of controlling the digital photographing apparatus. As a first image and a second image that is input by minutely adjusting a photographing direction from the first image are captured by using a pre-mounted handshake correction module, the second image that is accurately continuous from the first image may be obtained. As such, highly reliable panorama shooting may be enabled and an ultra-wide-angle image having a viewing angle greater than that of a currently mounted lens may be obtained without exchanging the currently mounted lens for an expensive lens used in wide-angle shooting.

11 Claims, 7 Drawing Sheets

DIGITAL PHOTOGRAPHING APPARATUS AND METHOD OF CONTROLLING THE SAME

CROSS-REFERENCE TO RELATED PATENT APPLICATION

This application claims the benefit of Korean Patent Application No. 10-2009-0112183, filed on Nov. 19, 2009, in the Korean Intellectual Property Office, the disclosure of which is incorporated herein in its entirety by reference.

BACKGROUND

The invention relates to a digital photographing apparatus including a handshake correction module and a method of controlling the digital photographing apparatus.

When panorama shooting is performed using a general digital camera, predetermined regions of an initially captured image and a subsequently captured image are compared, and a user is simply notified that the shooting is appropriate if the first and second images are continuous within a threshold value and that reshooting is requested if the first and second images are not continuous within the threshold value. However, a user may not easily capture accurately continuous images by seeing a live-view screen and has to perform reshooting when captured images are not continuous within a threshold value.

SUMMARY

Various embodiments of the invention provide a digital photographing apparatus capable of accurately capturing a second image that is continuous from a first image within a threshold value, and a method of controlling the digital photographing apparatus.

According to an embodiment of the invention, there is provided a method of controlling a digital photographing apparatus comprising a handshake correction module, the method including capturing and storing a first image; inputting a second image by moving a photographing direction; comparing the first and second images; if the second image is not continuous from the first image within a threshold value, adjusting the photographing direction by driving the handshake correction module such that the second image is continuous from the first image within the threshold value; and, if the second image is continuous from the first image within the threshold value, capturing and storing the second image.

The method may further include inputting the second image in the adjusted photographing direction.

The method may further include, if the second image is continuous from the first image within the threshold value, requesting to capture the second image.

The comparing of the first and second images may include comparing a back end of the first image and a front end of the second image with reference to the photographing direction.

The comparing of the first and second images may include determining whether the second image is similar to the first image; and, if the second image is similar to the first image, determining whether the second image is continuous from the first image within the threshold value.

The method may further include, if the second image is not similar to the first image, requesting to reinput the second image.

The handshake correction module may include one of an optical image stabilization (OIS) imaging device, an OIS lens, and a variable vertical angle prism.

According to another embodiment of the invention, there is provided a method of controlling a digital photographing apparatus comprising a handshake correction module, the method including capturing and storing a first image; capturing and storing a second image that is input by adjusting a photographing direction by driving the handshake correction module; determining an overlap region between the first and second images; and generating a composite image by compositing regions of the first and second images other than the overlap region.

The capturing and storing of the second image may include capturing and storing a plurality of second images that are input by adjusting the photographing direction into at least two photographing directions by driving the handshake correction module.

The capturing and storing of the second image may include capturing and storing at least one second image that is obtained by photographing at least one second subject around a first subject of the first image, by adjusting the photographing direction by driving the handshake correction module.

The method may further include detecting the photographing direction, and the overlap region between the first and second images may be determined by using the photographing direction.

The handshake correction module may include one of an optical image stabilization (OIS) imaging device, an OIS lens, and a variable vertical angle prism.

According to another embodiment of the invention, there is provided a digital photographing apparatus including a photographing unit for capturing a first image and a second image that is input by moving a photographing direction from the first image; a memory for storing the first and second images; an image comparison unit for comparing the first and second images; and a handshake correction module for, if the second image is not continuous from the first image within a threshold value, adjusting the photographing direction such that the second image is continuous from the first image within the threshold value.

The photographing unit may input and capture the second image in the adjusted photographing direction.

The apparatus may further include a capture requesting unit for, if the second image is continuous from the first image within the threshold value, requesting to capture the second image.

The image comparison unit may compare a back end of the first image and a front end of the second image with reference to the photographing direction.

The image comparison unit may include a similarity determination unit for determining whether the second image is similar to the first image; and a threshold determination unit for, if the second image is similar to the first image, determining whether the second image is continuous from the first image within the threshold value.

The apparatus may further include a reinput requesting unit for, if the second image is not similar to the first image and similar image, requesting to reinput the second image.

The handshake correction module may include one of an optical image stabilization (OIS) imaging device, an OIS lens and a variable vertical angle prism.

According to another aspect of the invention, there is provided a digital photographing apparatus including a photographing unit for capturing a first image and a second image that is input by moving a photographing direction from the first image; a handshake correction module for adjusting the photographing direction; an overlap region determination unit for determining an overlap region between the first and second images; and a composition unit for generating a composite image by compositing regions of the first and second images other than the overlap region.

The handshake correction module may adjust the photographing direction into at least two photographing directions, and the photographing unit may capture a plurality of second images that are separately input in the at least two adjusted photographing directions.

The photographing unit may capture at least one second image that is input in the adjusted photographing direction and is obtained by photographing at least one second subject around a first subject of the first image.

The apparatus may further include a photographing direction detection unit for detecting the photographing direction, and the overlap region determination unit may determine the overlap region between the first and second images by using the photographing direction.

The handshake correction module may include one of an optical image stabilization (OIS) imaging device, an OIS lens, and a variable vertical angle prism.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter a digital photographing apparatus and a method of controlling the same, according to embodiments of the invention, will be described in detail with reference to the attached drawings. The digital photographing apparatus may also be applied to digital devices such as digital cameras, video cameras, personal digital assistants (PDAs), televisions (TVs), digital picture frames, mobile phones, portable multimedia players (PMPs), and similar devices.

Figure 1:
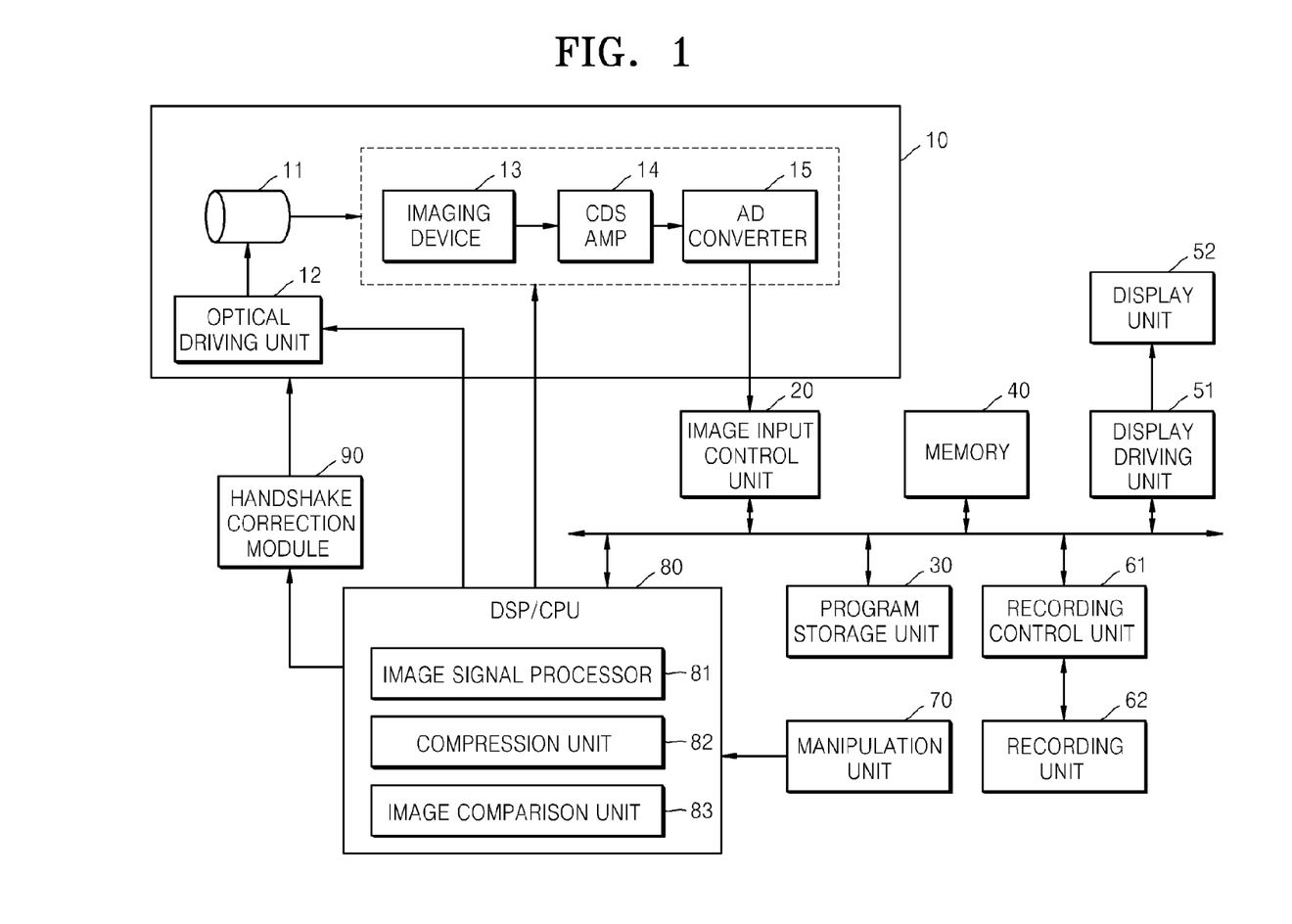
FIG. 1 is a block diagram of a digital photographing apparatus, according to an embodiment of the invention.

FIG. 1 is a block diagram of a digital photographing apparatus, according to an embodiment of the invention.

Referring to FIG. 1, the digital photographing apparatus according to the current embodiment includes a photographing unit 10, an image input control unit 20, a program storage unit 30, a memory 40, a display driving unit 51 and a display unit 52, a recording control unit 61 and a recording unit 62, a manipulation unit 70, a digital signal processor (DSP)/central processing unit (CPU) 80, and a handshake correction module 90.

The photographing unit 10 includes an optical unit 11, an optical driving unit 12 for driving the optical unit 11, an imaging device 13, a correlated double sampler (CDS)/amplifier (AMP) 14 and an analog-to-digital (AD) converter 15.

The optical unit 11 may include a lens for obtaining an optical signal, an iris for adjusting the intensity of the optical signal (light intensity), and a shutter for controlling an input of the optical signal. The lens includes a zoom lens for widening or narrowing a viewing angle according to a focal length, and a focus lens for focusing on a subject. Each of the zoom and focus lenses may be formed as a single lens or a group of a plurality of lenses. The shutter may be a mechanical shutter for moving a lens shade up and down. In this case, instead of including an additional shutter device, providing of an electrical signal to the imaging device 13 may be controlled so as to function as the shutter.

The optical driving unit 12 for driving the optical unit 11 may control the position of the lens, opening or closing of the iris, operation of the shutter and the like so as to perform auto focusing, automatic exposure adjustment, aperture adjustment, zooming, focus changing and the like. The optical driving unit 12 may receive a control signal from the DSP/CPU 80 so as to drive the optical unit 11.

The imaging device 13 includes a photoelectric conversion device for receiving an optical signal input through the optical unit 11 and converting the optical signal into an electrical signal. The photoelectric conversion device may be a charge-coupled device (CCD) sensor array, a complementary metal-oxide semiconductor (CMOS) sensor array or the like.

The CDS/AMP 14 removes low-frequency noise from the electrical signal output from the imaging device 13 and amplifies the electrical signal to a certain level.

The AD converter 15 digitally converts the electrical signal output from the CDS/AMP 14 so as to generate a digital signal, and outputs the generated digital signal to the image input control unit 20.

The imaging device 13, the CDS/AMP 14 and the AD converter 15 may be controlled according to a timing signal provided by a timing generator (TG) of the DSP/CPU 80. The TG outputs a timing signal to the imaging device 13 so as to control an exposure period of each pixel of the photoelectric conversion device or to control charges to be read. Accordingly, the imaging device 13 may provide image data corresponding to one frame image according to the timing signal provided by the TG.

The program storage unit 30 may store an operating system (OS), an application program and the like which are required to operate the digital photographing apparatus. The program storage unit 30 may be electrically erasable programmable read-only memory (E2PROM), flash memory, read-only memory (ROM) or the like.

The memory 40 temporally stores image data of a captured image. The memory 40 may store image data of a plurality of images and sequentially maintains image signals during focus control so as to output the image signals. The memory may control an image to be read from or to be written to the image input control unit 20. Also, the memory 40 may include an image display memory having at least one channel. Image data may be simultaneously input and output between the memory 40 and the display driving unit 51. The resolution or the maximum number or colors of the display unit 52 depends on the capacity of the image display memory.

The recording control unit 61 controls writing of image data to the recording unit 62, or reading of image data or setup information recorded on the recording unit 62. The recording unit 62 may be, for example, an optical disk (a compact disk (CD), a digital versatile disk (DVD), Blu-ray disk etc.), a magneto-optical disk, a magnetic disk, a semiconductor recording medium, or similar device, and records captured image data. The recording control unit 61 and the recording unit 62 may be detachable from the digital photographing apparatus.

The display driving unit 51 drives the display unit 52 to display various setup screens or to display an image corresponding to image data generated by photographing a subject. The image data may be recorded on the recording unit 62, or may be provided by the memory 40 in real time. The display driving unit 51 and the display unit 52 may be a display device such as a liquid crystal display (LCD), an organic light emitting diode (OLED), a plasma display panel (PDP), an electronic digital display (EDD), or similar device.

The manipulation unit 70 may include elements for a user to manipulate the digital photographing apparatus or to manage various photographing setups. For example, the manipulation unit 70 may include buttons, keys, a touch panel, a touch screen, a dial or the like, and may input user manipulation signals such as power on/off signals, photographing start/stop signals, reproduction start/stop/search signals, an optical system driving signal, a mode change signal, a menu manipulation signal, a selection manipulation signal and the like. For example, a shutter button may be half-pressed, full-pressed, or released by the user. A focus control start manipulation signal is output when the shutter button is half-pressed (manipulation S1), and focus control is terminated when the half-pressed shutter button is released. A photographing start manipulation signal may be output when the shutter button is full-pressed (manipulation S2). A manipulation signal may be transmitted to, for example, the DSP/CPU 80 so as to drive an element corresponding to the manipulation signal.

The DSP/CPU 80 functions as a calculation device and a control device by using a program, and controls operations of other elements included in the digital photographing apparatus. For example, the DSP/CPU 80 outputs a control signal to the optical driving unit 12 based on focus control or exposure control so as to drive the optical unit 11. Also, the DSP/CPU 80 controls the other elements of the digital photographing apparatus based on signals input from the manipulation unit 70. Although the DSP/CPU 80 is a single element in FIG. 1, a plurality of CPUs may be included such that commands of a signal system and commands of a manipulation system are executed by different CPUs.

Also, the DSP/CPU 80 may include an image signal processor 81, a compression unit 82, and an image comparison unit 83.

The image signal processor 81 may reduce noise from input image data and may perform image signal processing such as gamma correction, color filter array interpolation, color matrix, color correction, color enhancement, or similar processing.

The compression unit 82 receives an uncompressed image signal and compresses the image signal in a compression format such as a Joint Photographic Experts Group (JPEG) compression format or a Lempel-Ziv-Welch (LZW) compression format.

The photographing unit 10 may capture a first image and a second image that is input by moving a photographing direction from the first image. The memory 40 may store the first and second images. In this case, the photographing direction is a direction in which the user moves the digital photographing apparatus for panorama shooting.

The image comparison unit 83 may compare the first and second images to determine whether the second image is continuous from the first image so as to form panorama images. In more detail, the image comparison unit 83 may compare, for example, image patterns and color information between a back end of the first image and a front end of the second image with reference to the photographing direction.

If the image comparison unit 83 determines that the second image is not continuous from the first image within a threshold value, the handshake correction module 90 may adjust the photographing direction such that the second image is continuous from the first image within the threshold value. The handshake correction module 90 may include, for example, an optical image stabilization (OIS) imaging device, an OIS lens, or a variable vertical angle prism.

In FIG. 1, the handshake correction module 90 is a device for correcting image blurring generated due to handshake when a photographing signal is input, and may be used to capture an image that is continuous from the first image as the second image in a panorama shooting mode. The handshake correction module 90 may drive the photographing unit 10 such that the second image that is input in a current live-view mode is captured to be continuous within a threshold value from the first image that is already captured and stored in the recording unit 62. The handshake correction module 90 may drive the photographing unit 10 so as to adjust the photographing direction. In this case, the photographing direction may be adjusted by moving the photographing unit 10 due to the operation of the handshake correction module 90. The photographing unit 10 may input and capture the second image in the adjusted photographing direction. Accordingly, the first and second images may be formed as continuous images within a threshold value.

Figure 2:
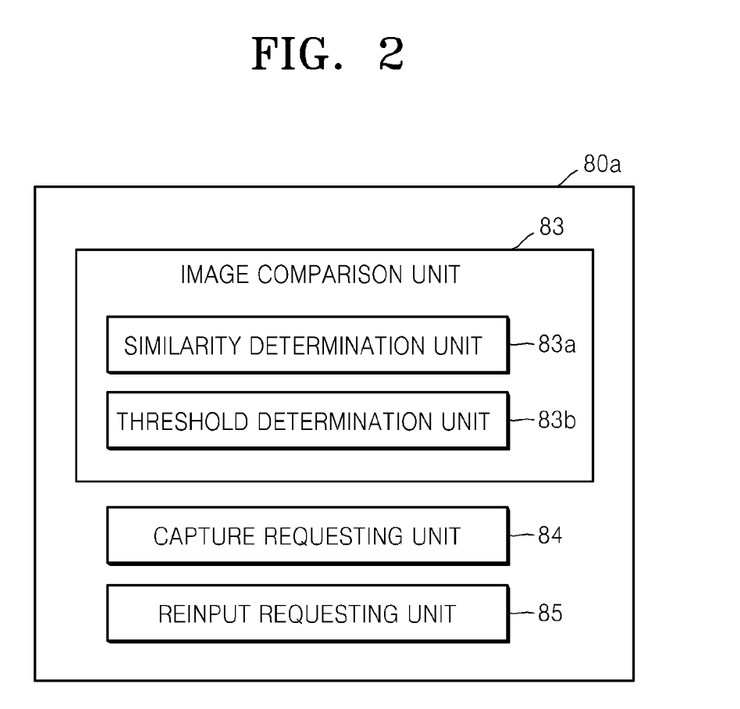
FIG. 2 is a block diagram of a digital signal processor (DSP)/central processing unit (CPU) of the digital photographing apparatus illustrated in FIG. 1, according to an embodiment of the invention.

FIG. 2 is a block diagram of a DSP/CPU 80a of the digital photographing apparatus illustrated in FIG. 1, according to an embodiment of the invention.

Referring to FIG. 2, the DSP/CPU 80a may include an image comparison unit 83, a capture requesting unit 84, and a reinput requesting unit 85. Although not shown in FIG. 2, the DSP/CPU 80a may further include an image signal processor and a compression unit.

In FIG. 2, the image comparison unit 83 includes a similarity determination unit 83a and a threshold determination unit 83b.

The similarity determination unit 83a determines whether a second image is similar to a first image. When a user captures the first image by using the digital photographing apparatus, stores the first image in the recording unit 62, and then inputs the second image in a live-view mode by moving the digital photographing apparatus, if the user excessively moves the digital photographing apparatus, the handshake correction module 90 may not be driven to capture the second image that is continuous from the first image. Accordingly, it may be determined whether the second image is similar to the first image, before the handshake correction module 90 is driven. The similarity between the first and second images may be determined by comparing, for example, image patterns, image data and noticeable features of the first and second images. If the second image is not similar to the first image, the reinput requesting unit 85 may be controlled to request to reinput the second image. An example of the reinput request may be a message for notifying the user that panorama shooting is disabled in a live-view mode in which the second image is input. For example, text or a figure may be displayed on the display unit 50, or an alarm sound may be output through a speaker.

If the similarity determination unit 83a determines that the second image is similar to the first image, the threshold determination unit 83b may determine whether the second image is continuous from the first image within a threshold value.

If the threshold determination unit 83b determines that the second image is continuous from the first image within the threshold value, the capture requesting unit 84 may request to capture the second image. Otherwise, if the threshold determination unit 83b determines that the second image is not continuous from the first image within the threshold value, the handshake correction module 90 may drive and move a lens or a prism of the optical unit 11, or the imaging device 13, such that the second image is continuous from the first image within the threshold value. If a photographing direction is adjusted by moving the lens or the prism of the optical unit 11, or the imaging device 13, the threshold determination unit 83b redetermines whether the second image that is input in the adjusted photographing direction is continuous from the first image within the threshold value. If the second image is continuous from the first image within the threshold value, the capture requesting unit 84 may request to capture the second image. Accordingly, the second image may be stored in the recording unit 62 after image signal processing and compression are performed.

The first and second images may be stored in the recording unit 62 as different image files, or may be stored in the recording unit 62 as one image file by generating a composite image obtained by compositing regions of the first and second images other than an overlap region between the first and second images.

Figure 3:
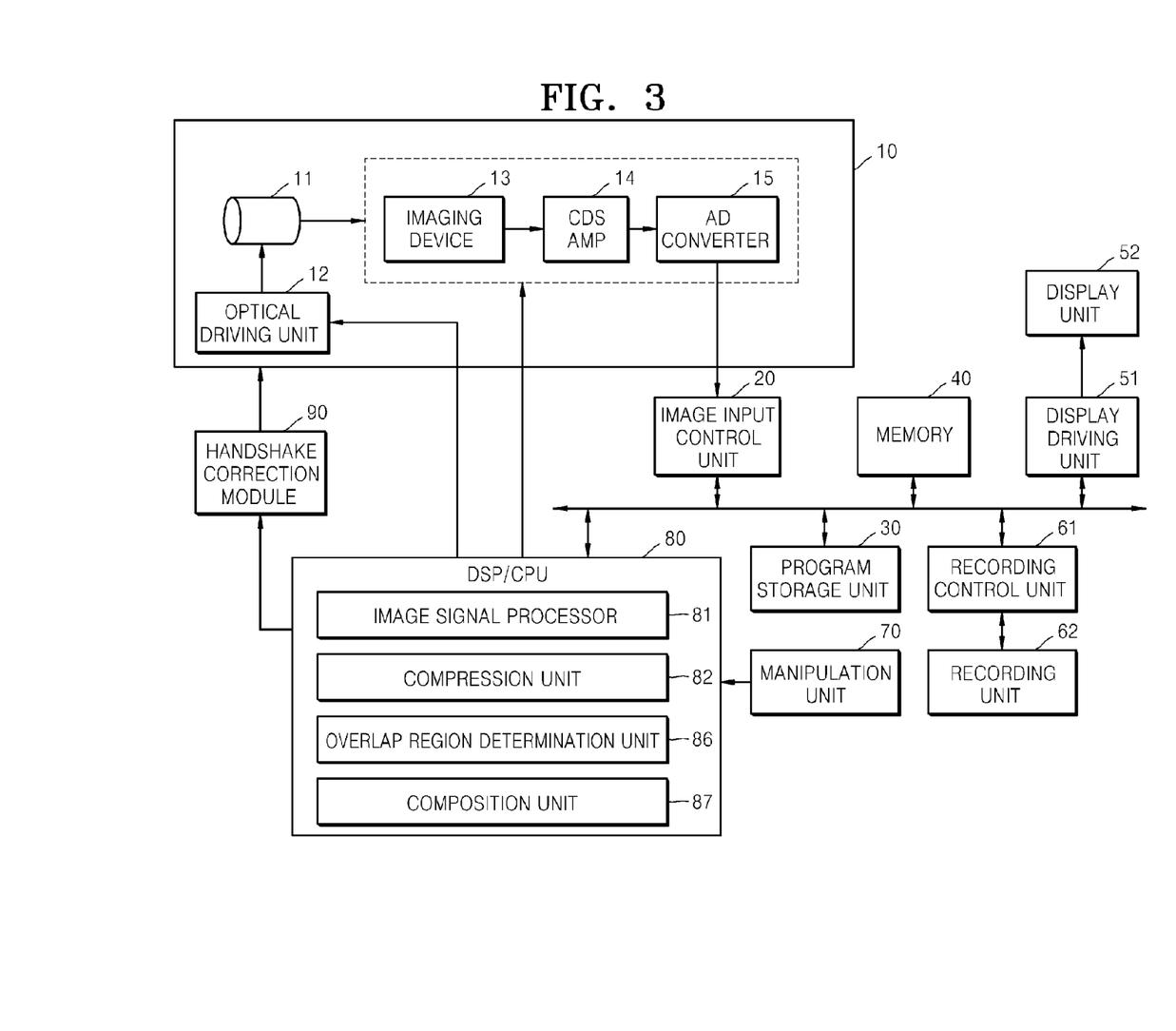
FIG. 3 is a block diagram of a digital photographing apparatus, according to another embodiment of the invention.

FIG. 3 is a block diagram of a digital photographing apparatus, according to another embodiment of the invention. The digital photographing apparatus according to the current embodiment is similar to the digital photographing apparatus illustrated in FIG. 1, except the DSP/CPU 80. Accordingly, the DSP/CPU 80 will be mainly described here.

Referring to FIG. 3, the digital photographing apparatus according to the current embodiment also includes a photographing unit 10, an image input control unit 20, a program storage unit 30, a memory 40, a display driving unit 51 and a display unit 52, a recording control unit 61 and a recording unit 62, a manipulation unit 70, the DSP/CPU 80, and a handshake correction module 90.

Also, the photographing unit 10 includes an optical unit 11, an optical driving unit 12 for driving the optical unit 11, an imaging device 13, a CDS/AMP 14 and an AD converter 15.

The DSP/CPU 80 may include an image signal processor 81, a compression unit 82, an overlap region determination unit 86 and a composition unit 87.

The image signal processor 81 may reduce noise from input image data and may perform image signal processing such as gamma correction, color filter array interpolation, color matrix, color correction, color enhancement, or similar processing.

The compression unit 82 receives an uncompressed image signal and compresses the image signal in a compression format such as a JPEG compression format or an LZW compression format.

The photographing unit 10 may capture a first image and a second image that is input by moving a photographing direction from the first image. In this case, the second image is input in the photographing direction that is adjusted by the handshake correction module 90.

The overlap region determination unit 86 determines an overlap region between the first and second images. The overlap region may be determined by using, for example, image pattern information, color information, and noticeable features of the first and second images.

The composition unit 87 may generate a composite image by compositing regions except the overlap region of the first and second images.

The handshake correction module 90 may include, for example, an OIS imaging device, an OIS lens, or a variable vertical angle prism.

In FIG. 3, the handshake correction module 90 is a device for correcting image blurring generated due to handshake when a photographing signal is input, and may be used in a wide-angle photographing mode for generating an image having a viewing angle greater than a maximum viewing angle of the optical unit 11. That is, after the first image is captured and stored, as a current photographing direction is adjusted by driving the photographing unit 10 by the handshake correction module 90, the second image in which a neighboring region of a subject of the first image is photographed may be captured.

After the second image is stored, as a composite image including the subject of the first image and the neighboring region of the subject is generated by compositing the first and second images, the composite image may have a viewing angle greater than the maximum viewing angle of the optical unit 11. In order to generate a composite image having a greater viewing angle, the handshake correction module 90 may adjust the photographing direction into at least two photographing directions and thus a composite image having an ultra-wide angle may be generated by compositing the first image with a plurality of second images captured in the adjusted photographing directions. Alternatively, the handshake correction module 90 may adjust the photographing direction of the photographing unit 10 such that at least one second subject around a first subject of the first image is photographed. Accordingly, the photographing unit 10 may capture at least one second image in the adjusted photographing direction and the composition unit 87 may generate a composite image by compositing the first and second images.

Figure 4:
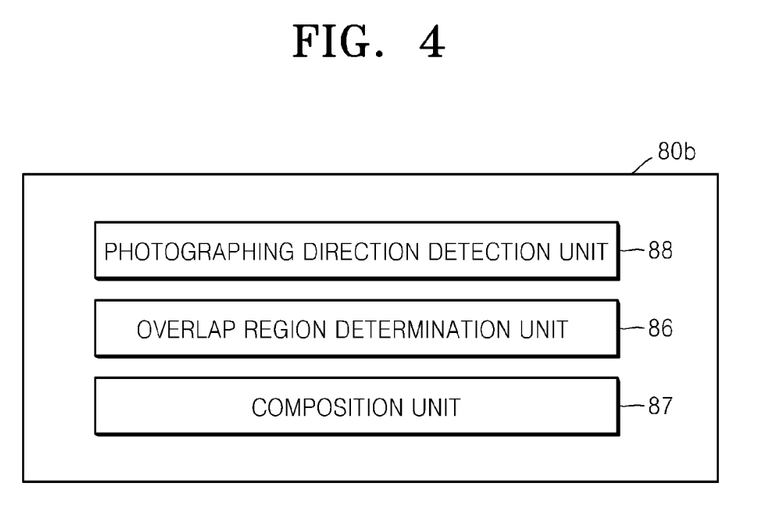
FIG. 4 is a block diagram of a DSP/CPU of the digital photographing apparatus illustrated in FIG. 3, according to an embodiment of the invention.

FIG. 4 is a block diagram of a DSP/CPU 80b of the digital photographing apparatus illustrated in FIG. 3, according to an embodiment of the invention.

Referring to FIG. 4, the DSP/CPU 80b includes a photographing direction detection unit 88, an overlap region determination unit 86, and a composition unit 87. Although not shown in FIG. 4, the DSP/CPU 80b may further include an image signal processor and a compression unit.

The photographing direction detection unit 88 may detect a photographing direction.

The overlap region determination unit 86 may determine an overlap region between the first and second images according to the detected photographing direction. For example, if the handshake correction module 90 moves the photographing unit 10 by five pixels in a right direction, the overlap region determination unit 86 may determine a region of the first image other than a back end of the first image corresponding to five horizontal pixels in the right direction and a region of the second image other than a front end of the second image corresponding to five horizontal pixels in the right direction, as the overlap region.

The composition unit 87 may generate a composite image by compositing regions of the first and second images other than the overlap region.

Figure 5:
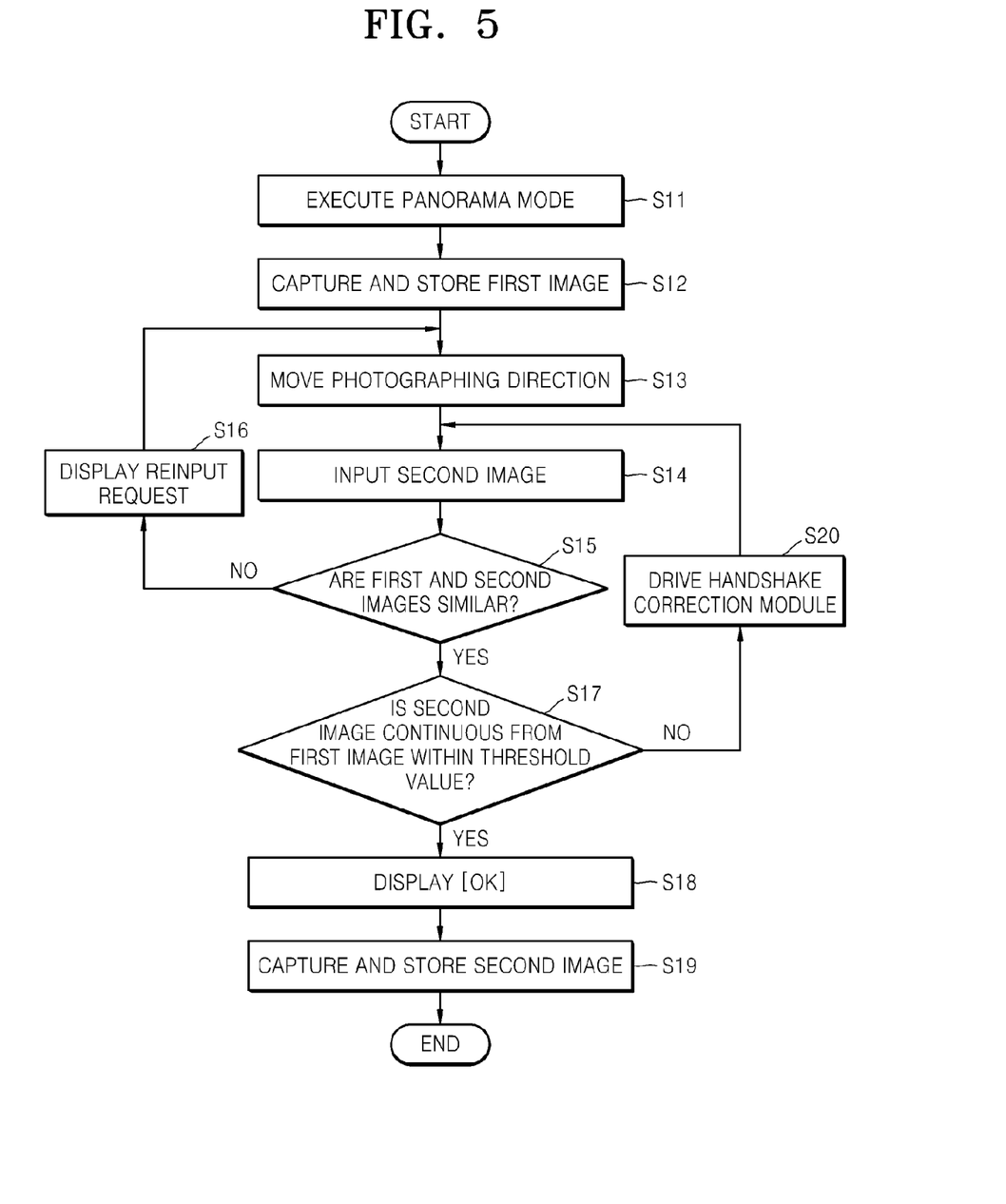
FIG. 5 is a flowchart of a method of controlling a digital photographing apparatus, according to an embodiment of the invention.

FIG. 5 is a flowchart of a method of controlling a digital photographing apparatus, according to an embodiment of the invention. In FIG. 5, the digital photographing apparatus includes a handshake correction module and may be, for example, a digital camera, a video camera, a PDA, a TV, a digital picture frame, a mobile phone, a PMP, or similar apparatus.

Referring to FIG. 5, a panorama mode is executed (operation S11).

After a first image input through a live-view screen is checked, the first image is captured by fully pressing a shutter release button and then is stored (operation S12).

A user moves a photographing direction by moving the digital photographing apparatus for panorama shooting (operation S13).

A second image is input in the moved photographing direction (operation S14). The second image may be displayed on the live-view screen.

It is determined whether the stored first image and the currently input second image are similar (operation S15). If the first and second images are not similar, a reinput request for requesting to reinput the second image may be displayed to the user (operation S16). Then, the user may re-move the photographing direction by re-moving the digital photographing apparatus (operation S13).

Otherwise, if the first and second images are similar, it may be determined whether the second image is continuous from the first image within a threshold value (operation S17).

If the second image is continuous from the first image within the threshold value, "[OK]" may be displayed on the live-view screen (operation S18).

After the "[OK]" prompt is confirmed by the user, the user fully presses the shutter release button so as to capture and store the second image displayed on the live-view screen (operation S19).

If the first and second images are similar, but the second image is not continuous from the first image within the threshold value, a photographing unit may be moved by driving the handshake correction module (operation S20). Accordingly, the photographing direction may be adjusted. The photographing direction is adjusted such that the second image is continuous from the first image within the threshold value. The second image is input in the adjusted photographing direction (operation S14), and then operations S15 through S20 may be repeated.

Figure 6A:
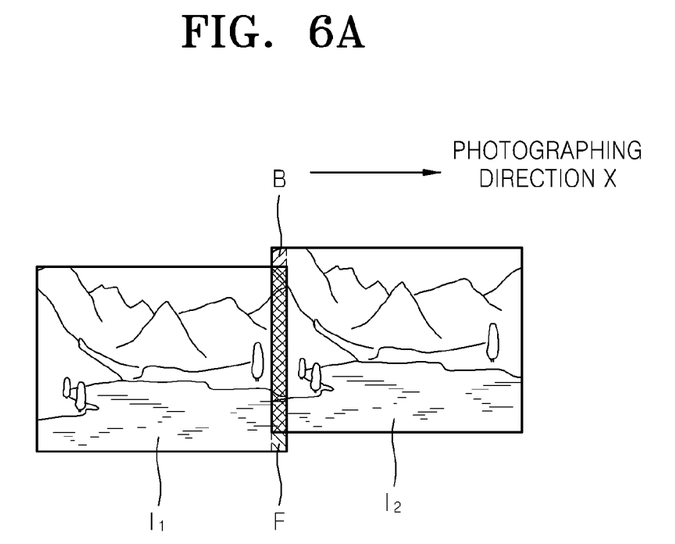
FIGS. 6A and 6B are pictorial images that respectively show panorama images before and after the method of FIG. 5 is performed, according to an embodiment of the invention.
Figure 6B:
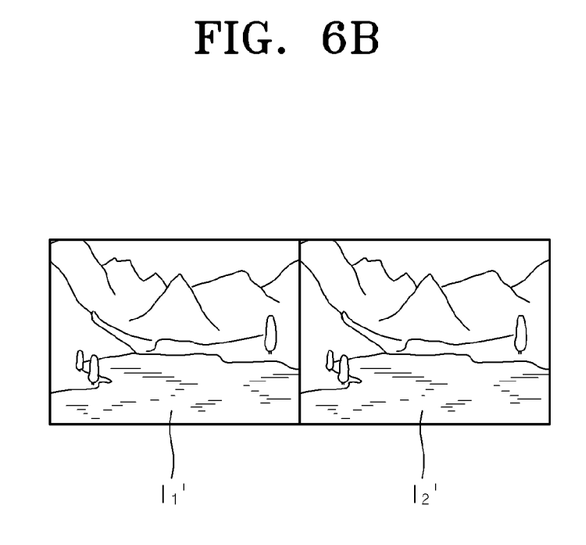

FIGS. 6A and 6B respectively show panorama images before and after the method of FIG. 5 is performed, according to an embodiment of the invention.

Referring to FIG. 6A, if a photographing direction is not minutely adjusted by using a handshake correction module, when a user performs panorama shooting by arbitrarily moving a digital photographing apparatus, an overlap region occurs and top and bottom lines do not match. Accordingly, desired panorama images may not be easily obtained. First and second images I1 and I2 captured by moving a photographing direction X have top and bottom edges that do not match and thus corner images F and B are generated.

On the other hand, referring to FIG. 6B, as a photographing direction is minutely adjusted by using a handshake correction module, a first image I1' and a second image I2' that is continuous from the first image I1' have a minimum overlap region and have top and bottom edges that match. Accordingly, desired panorama images may be obtained.

As such, accurately continuous panorama images may be obtained by using a pre-mounted handshake correction module.

Figure 7:
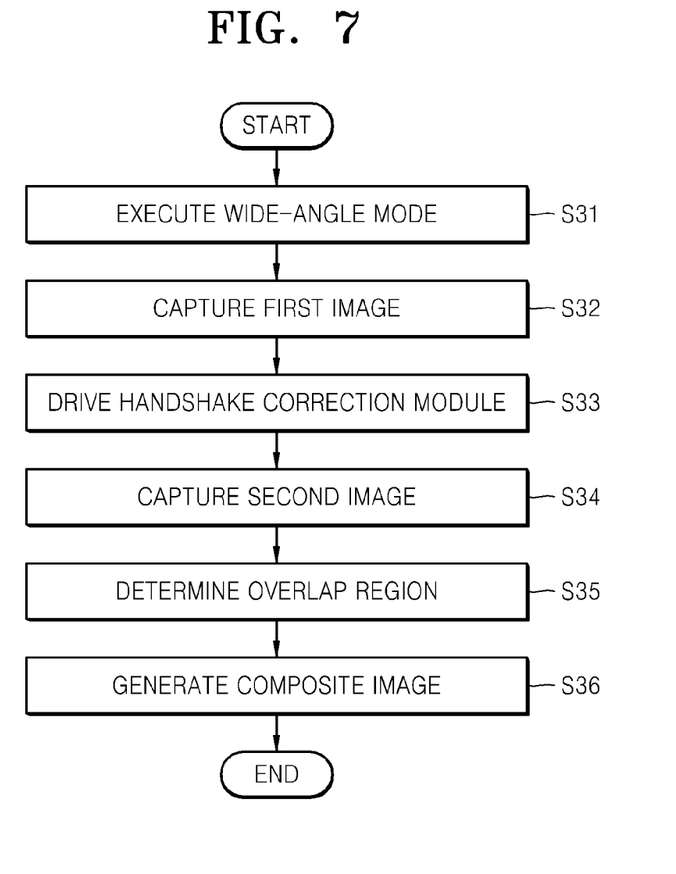
FIG. 7 is a flowchart of a method of controlling a digital photographing apparatus, according to another embodiment of the invention.

FIG. 7 is a flowchart of a method of controlling a digital photographing apparatus, according to another embodiment of the invention. In FIG. 7, the digital photographing apparatus includes a handshake correction module and may be, for example, a digital camera, a video camera, a PDA, a TV, a digital picture frame, a mobile phone, a PMP, or a similar apparatus.

Referring to FIG. 7, a wide-angle mode is executed (operation S31).

In the wide-angle mode, a first image is captured (operation S32). The captured first image may be temporarily stored.

The handshake correction module is driven (operation S33) so as to capture at least one second image. The handshake correction module may move, for example, a lens or an imaging device so as to minutely adjust a photographing direction. The photographing direction is adjusted such that a neighboring region of a first subject of the first image is photographed. As photographing is performed in the adjusted photographing direction, the second image includes an image of the neighboring region.

An overlap region between the stored first image and the captured second image is determined (operation S35), and regions of the first and second images other than the overlap region are composited so as to generate a composite image (operation S36). Accordingly, the composite image may have a viewing angle greater than that of the first image.

Figure 8:
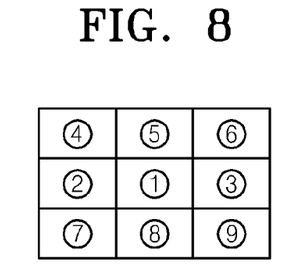
FIG. 8 shows a wide-angle image generated by performing the method of FIG. 7, according to an embodiment of the invention.

FIG. 8 shows a wide-angle image generated by performing the method of FIG. 7, according to an embodiment of the invention.

Referring to FIG. 8, the wide-angle image is an example of a composite image including a first subject (photographing direction ①) and neighboring regions (photographing directions ②, ③, ④, ⑤, ⑥, ⑦, ⑧, and ⑨) around the first subject. The composite image may be generated by compositing a first image obtained by photographing the first subject with second images obtained by photographing the neighboring regions around the first subject. In this case, a handshake correction module moves a lens or an imaging device in the order of ①→②→③→④→⑤→⑥→⑦→⑧→⑨ such that a first image and eight second images around the first image may be captured. Then, the first and second images may be composited so as to generate the composite image illustrated in FIG. 8 as a wide-angle image.

According to the current embodiment, wide-angle shooting may be performed by using a handshake correction module without exchanging a currently mounted lens for an expensive lens used in wide-angle shooting.

As described above, a first image and a second image that is input by minutely adjusting a photographing direction from the first image by using a handshake correction module may be captured and stored. Accordingly, the second image that is accurately continuous from the first image may be obtained. As such, highly reliable panorama shooting may be enabled and an ultra-wide-angle image having a viewing angle greater than that of a currently mounted lens may be obtained without exchanging the currently mounted lens for an expensive lens used in wide-angle shooting.

The invention can also be implemented as computer-readable code on a computer-readable recording medium. The computer-readable recording medium is any data storage device that can store data which can be thereafter read by a computer system.

Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. Also, functional programs, codes, and code segments for accomplishing the invention can be easily construed by programmers of ordinary skill in the art to which the invention pertains.

While the invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the invention.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A method of controlling a digital photographing apparatus comprising a handshake correction module, the method comprising:
    capturing and storing a first image;
    inputting a second image by moving a photographing direction;
    comparing the first and second images, comprising:
        determining whether the second image is similar to the first image after inputting the second image; and
        if the second image is similar to the first image, determining whether the second image is continuous from the first image within the threshold value without moving the photographing direction,
        if the second image is not similar to the first image, requesting to reinput the second image;
    if the second image is not continuous from the first image within a threshold value, adjusting the photographing direction by driving the handshake correction module such that the second image is continuous from the first image within the threshold value; and
    if the second image is continuous from the first image within the threshold value, capturing and storing the second image.

2. The method of claim 1, further comprising inputting the second image in the adjusted photographing direction.

3. The method of claim 1, further comprising, if the second image is continuous from the first image within the threshold value, requesting to capture the second image.

4. The method of claim 1, wherein the comparing of the first and second images comprises comparing a back end of the first image and a front end of the second image with reference to the photographing direction.

5. The method of claim 1, further comprising:
    detecting the photographing direction; and
    determining an overlap region between the first and second images, wherein the overlap region between the first and second images is determined by using the photographing direction.

6. A digital photographing apparatus comprising:
a photographing unit for capturing a first image and a second image that is input by moving a photographing direction from the first image;
a memory for storing the first and second images;
an image comparison unit for comparing the first and second images, comprising:
   a similarity determination unit for determining whether the second image is similar to the first image after the second image is input;
   a threshold determination unit for, if the second image is similar to the first image, determining whether the second image is continuous from the first image within the threshold value without moving the photographing direction; and
   a reinput requesting unit for, if the second image is not similar to the first image, requesting to reinput the second image; and
a handshake correction module for, if the second image is not continuous from the first image within a threshold value, adjusting the photographing direction such that the second image is continuous from the first image within the threshold value.

7. The apparatus of claim 6, wherein the photographing unit inputs and captures the second image in the adjusted photographing direction.

8. The apparatus of claim 6, further comprising a capture requesting unit for, if the second image is continuous from the first image within the threshold value, requesting to capture the second image.

9. The apparatus of claim 6, wherein the image comparison unit compares a back end of the first image and a front end of the second image with reference to the photographing direction.

10. The apparatus of claim 6, further comprising:
   a photographing direction detection unit for detecting the photographing direction; and
   an overlap region determination unit for determining an overlap region between the first and second images by using the photographing direction.

11. The apparatus of claim 6, wherein the handshake correction module comprises one of an optical image stabilization (OIS) imaging device, an OIS lens, and a variable vertical angle prism.

* * * * *

UNITED STATES PATENT AND TRADEMARK OFFICE
CERTIFICATE OF CORRECTION

| | | |
|---|---|---|
| PATENT NO. | : 8,654,204 B2 | Page 1 of 1 |
| APPLICATION NO. | : 12/948955 | |
| DATED | : February 18, 2014 | |
| INVENTOR(S) | : Young-soo Jang | |

It is certified that error appears in the above-identified patent and that said Letters Patent is hereby corrected as shown below:

ON THE TITLE PAGE AND IN THE SPECIFICATION:

In Item (54) and column 1 replace

"DIGTAL PHOTOGRAPHING APPARATUS AND METHOD OF CONTROLLING THE SAME" with

--DIGITAL PHOTOGRAPHING APPARATUS AND METHOD OF CONTROLLING THE SAME--

Signed and Sealed this
Seventh Day of October, 2014

Michelle K. Lee
*Deputy Director of the United States Patent and Trademark Office*